(12) United States Patent
Sakita et al.

(10) Patent No.: US 11,585,903 B2
(45) Date of Patent: Feb. 21, 2023

(54) LIGHT EMITTING DEVICE, OPTICAL DEVICE, AND INFORMATION PROCESSING DEVICE

(71) Applicant: FUJIFILM BUSINESS INNOVATION CORP., Tokyo (JP)

(72) Inventors: Tomoaki Sakita, Ebina (JP); Satoshi Inada, Ebina (JP); Takeshi Minamiru, Ebina (JP); Daisuke Iguchi, Ebina (JP); Kazuhiro Sakai, Ebina (JP); Yoshinori Shirakawa, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 890 days.

(21) Appl. No.: 16/511,029

(22) Filed: Jul. 15, 2019

(65) Prior Publication Data

US 2020/0249320 A1 Aug. 6, 2020

(30) Foreign Application Priority Data

Feb. 6, 2019 (JP) .............................. JP2019-019976

(51) Int. Cl.
*G01S 7/481* (2006.01)
*G01S 17/89* (2020.01)
(Continued)

(52) U.S. Cl.
CPC ............ *G01S 7/4815* (2013.01); *G01B 11/24* (2013.01); *G01S 17/04* (2020.01); *G01S 17/89* (2013.01); *G06F 21/45* (2013.01); *H01S 5/183* (2013.01)

(58) Field of Classification Search
CPC ........ G01S 7/4815; G01S 17/04; G01S 17/89; G01B 11/24; G06F 21/45; H01S 5/183
See application file for complete search history.

(56) References Cited

U.S. PATENT DOCUMENTS

2007/0241655 A1* 10/2007 Sakemura .............. B82Y 10/00
445/51
2015/0069113 A1 3/2015 Wang et al.
(Continued)

FOREIGN PATENT DOCUMENTS

JP 2007-59741 A 3/2007
JP 2008-541435 A 11/2008
(Continued)

OTHER PUBLICATIONS

Oct. 4, 2022 Office Action issued in Japanese Patent Application No. 2019-019976.

*Primary Examiner* — Georgia Y Epps
*Assistant Examiner* — Don J Williams
(74) *Attorney, Agent, or Firm* — Oliff PLC

(57) ABSTRACT

Provided is a light emitting device including: a base material mounted on a wiring substrate; a light emitting element array provided on the base material; a first conductive pattern provided on the surface of the base material, the first conductive pattern including a first facing region connected to the light emitting element array, the first facing region being along a side surface of the light emitting element array and facing to the light emitting element array, and a first extending region extended beyond the first facing region; and penetrating members penetrating the base material from the first conductive pattern to a back surface side of the base material, each penetrating member being connected to the first facing region or the first extending region.

20 Claims, 6 Drawing Sheets

(51) Int. Cl.
    *G01B 11/24*     (2006.01)
    *G06F 21/45*     (2013.01)
    *G01S 17/04*     (2020.01)
    *H01S 5/183*     (2006.01)

(56) References Cited

U.S. PATENT DOCUMENTS

2015/0229912 A1     8/2015   Masalkar et al.
2018/0188610 A1*   7/2018   Shimizu ............... G09G 3/3607

FOREIGN PATENT DOCUMENTS

| JP | 2017-084899 A | 5/2017 |
| JP | 2017-513000 A | 5/2017 |
| JP | 2018-165983 A | 10/2018 |

\* cited by examiner

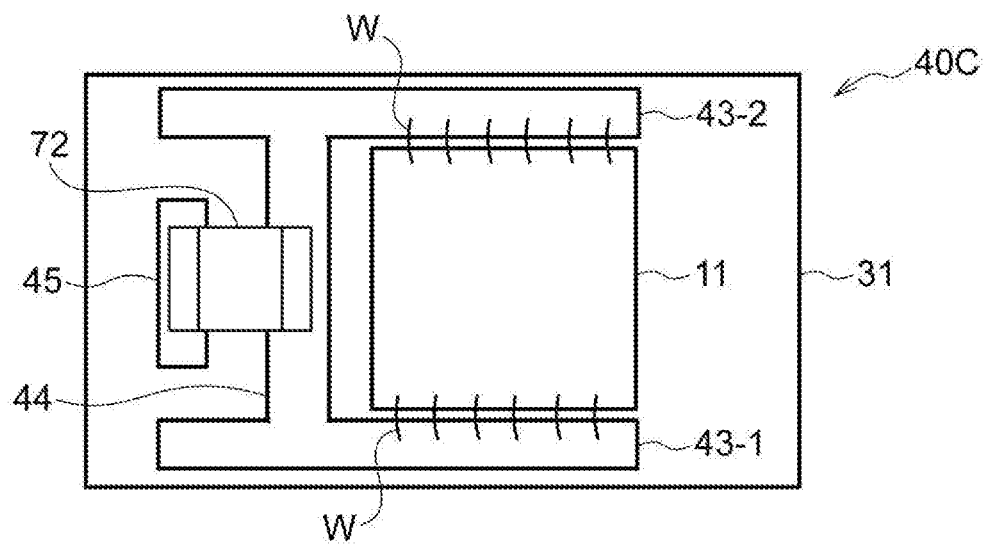
FIG.5C
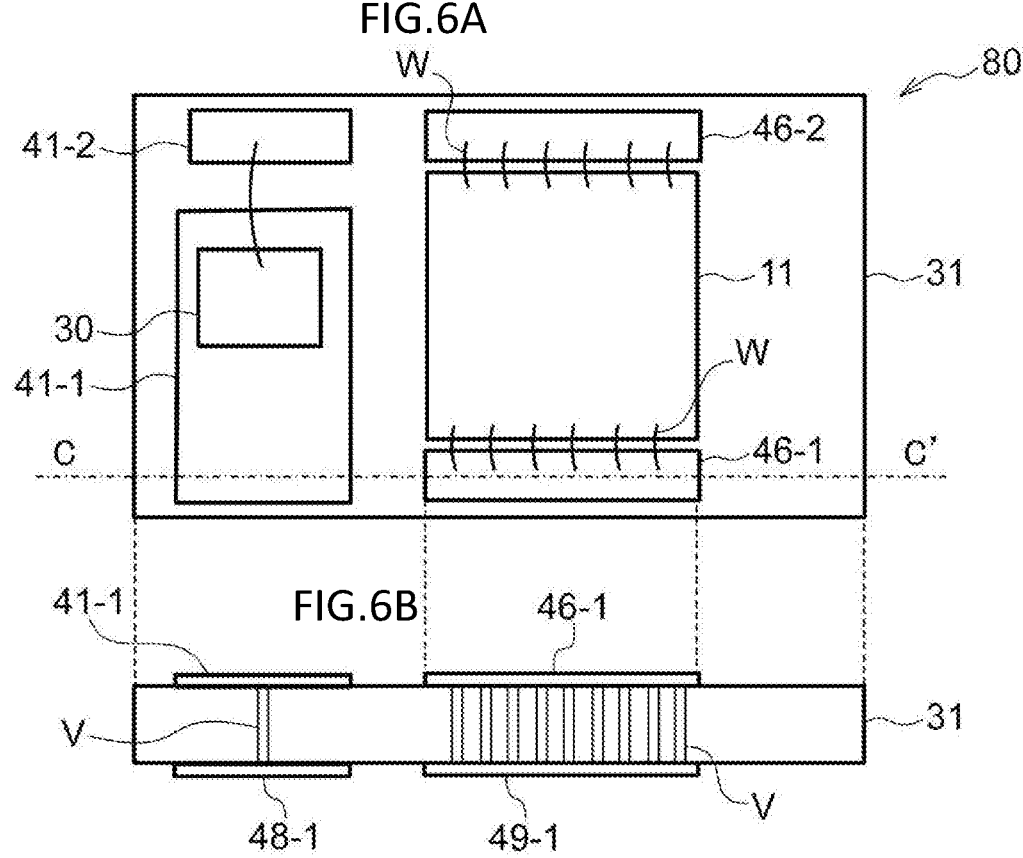
FIG.6A
FIG.6B

LIGHT EMITTING DEVICE, OPTICAL DEVICE, AND INFORMATION PROCESSING DEVICE

CROSS-REFERENCE TO RELATED APPLICATIONS

This application is based on and claims priority under 35 USC 119 from Japanese Patent Application No. 2019-019976 filed on Feb. 6, 2019.

BACKGROUND

Technical Field

The present invention relates to a light emitting device, an optical device, and an information processing device.

Related Art

Patent Literature 1 discloses a surface emitting laser array having a light emitting region including a plurality of light emitting units each formed by a surface emitting laser element including a lower reflecting mirror, a resonator region including an active layer, and an upper reflecting mirror. The surface emitting laser array includes: an electrode pad unit formed to surround a periphery of the light emitting region; and a wall formed to surround a periphery of the electrode pad unit and electrically insulated from the electrode pad unit.

CITATION LIST

Patent Literature

Patent Literature 1: JP-A-2017-084899

SUMMARY

Aspect of non-limiting embodiments of the present disclosure relates to provide a light emitting device, an optical device, and an information processing device configured to easily reduce inductance between a light emitting element array and a wiring substrate on which a base material on which the light emitting element array is arranged, compared with a configuration in which a conductive pattern is arranged only at a position facing the light emitting element array along an alignment direction of the light emitting element array, the conductive pattern connecting an upper electrode of the light emitting element array with a penetrating member of the base material.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a light emitting device including: a base material mounted on a wiring substrate; a light emitting element array provided on the base material; a first conductive pattern provided on the surface of the base material, the first conductive pattern including a first facing region connected to the light emitting element array, the first facing region being along a side surface of the light emitting element array and facing to the light emitting element array, and a first extending region extended beyond the first facing region; and a plurality of penetrating members penetrating the base material from the first conductive pattern to a back surface side of the base material, each penetrating member being connected to the first facing region or the first extending region.

BRIEF DESCRIPTION OF DRAWINGS

Exemplary embodiment(s) of the present invention will be described in detail based on the following figures, wherein:

FIG. 5C is a plan view of a third modification;

FIG. 6A is a plan view of a light emitting module according to a comparative example; and FIG. 6B is a side sectional view of the light emitting module according to the comparative example.

DETAILED DESCRIPTION

Hereinafter, exemplary embodiments for carrying out the present invention will be described in detail with reference to drawings.

A light emitting device, an optical device and an information processing device according to the exemplary embodiment are described with reference to FIGS. 1A to 4B. In the following exemplary embodiment, a portable information processing device represented by a smartphone is described as an example of the information processing device.

Figure 1A:
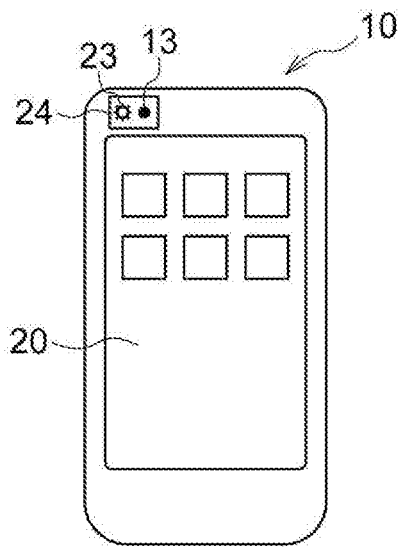
FIG. 1A is a diagram showing an example of an appearance of an information processing device according to an exemplary embodiment.

FIG. 1A shows an appearance of an information processing device 10 according to the exemplary embodiment. The information processing device 10 includes an optical device 24 and a user interface (UI) unit 20. The UI unit 20 is configured by integrating, for example, a display device which displays information to a user and an input device to which an instruction on information processing is input by operation of a user. The display device is, for example, a liquid crystal display or an organic EL display; and the input device is, for example, a touch panel.

The optical device 24 includes a light emitting device 23 and a three-dimensional sensor 13. The light emitting device 23 is a part which emits light toward an object to be measured in order to acquire a three-dimensional image. A person's face is described as an example of the object to be measured in the exemplary embodiment. The three-dimension sensor 13 receives reflected light in which light emitted by the light emitting device 23 is reflected back by the face. The three-dimensional sensor 13 according to the exemplary embodiment has a function of acquiring, for example, a three-dimensional image of a person's face based on a so-called time of flight (TOF) method.

Figure 1B:
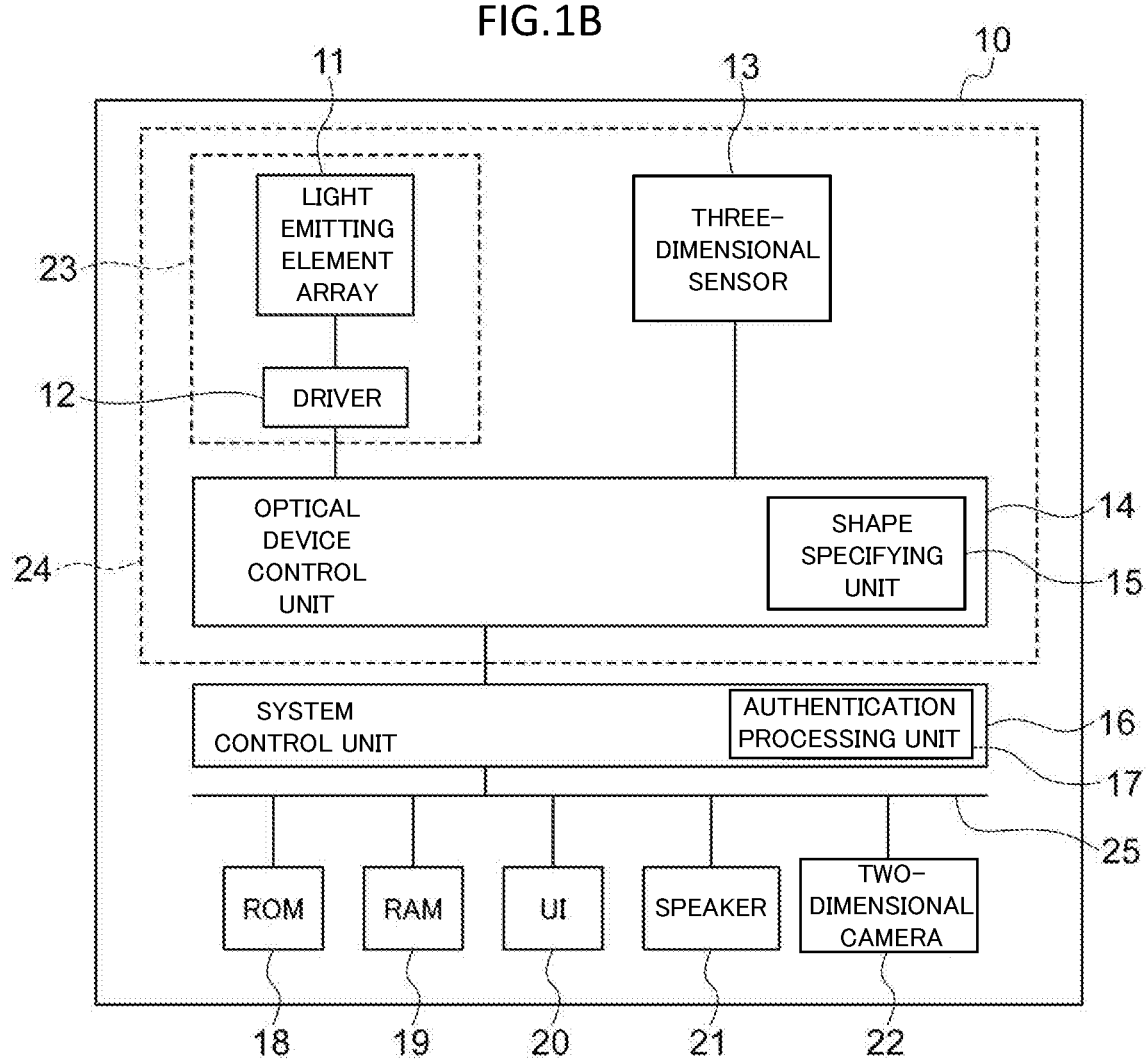
FIG. 1B is a block diagram showing an example of an electric configuration of the information processing device according to the exemplary embodiment.

An electric configuration of the information processing device 10 is described with reference to FIG. 1B. As shown in FIG. 1B, the information processing device 10 includes a system control unit 16, a ROM 18, a RAM 19, a UI unit 20, an optical device 24, a speaker 21, and a two-dimensional camera 22. Certainly, the configuration is an example, and a part of the configuration may be deleted, and another configuration may be added depending on purpose, use, or the like.

The system control unit 16 is, for example, a CPU, and the information processing device 10 is configured as a computer including the system control unit 16, the ROM 18, the RAM 19, and the like. The system control unit 16 controls the entire information processing device 10 as a system and includes an authentication processing unit 17. The ROM 18 includes a nonvolatile rewritable memory, for example, a flash memory. A program or a constant accumulated in the ROM 18 are loaded in the RAM 19, and the system control unit 16 executes the program, so that the information processing device 10 operates, and various information processing is executed. The speaker 21 is a part which emits sound to the user, and the two-dimensional camera 22 is a common camera provided for photographing by the user. Each of the ROM 18, the RAM 19, the UI unit 20, the speaker 21, and the two-dimensional camera 22 is connected to the system control unit 16 via a bus 25.

As shown in FIG. 1B, the optical device 24 includes the light emitting device 23, the three-dimensional sensor 13, and an optical device control unit 14. The optical device control unit 14 is connected to the system control unit 16 and controls the entire optical device 24. The optical device control unit 14 includes a shape specifying unit 15. Each of the light emitting device 23 and the three-dimensional sensor 13 is connected to the optical device control unit 14.

As shown in FIG. 1B, the light emitting device 23 includes a light emitting element array 11 and a driving element 12. The light emitting element array 11 is a semiconductor light emitting element in which a plurality of light emitting elements are arranged. The driving element 12 is a driver IC that drives the light emitting element array 11. The light emitting element array 11 is driven by the driving element 12 so as to emit pulsed light (light emitting pulse) of several tens of MHz to several hundreds of MHz, for example. The light emitting device 23 is configured such that the three-dimensional sensor 13 receives the reflected light in which light emitted from the light emitting element array 11 toward the object to be measured is reflected by the object to be measured.

Next, a relationship between the three-dimensional sensor 13 and the TOF will be described. The three-dimensional sensor 13 according to the exemplary embodiment includes a plurality of light receiving regions (pixels). The three-dimensional sensor 13 receives the reflected light (light receiving pulse) from the object to be measured with respect to the light emitting pulse from the light emitting element array 11, and accumulates charges corresponding to time until light is received for each light receiving region. As an example, the three-dimensional sensor 13 is configured as a CMOS structure device in which each light receiving region includes two gates and a charge accumulating unit corresponding to the two gates. By alternately applying a pulse to the two gates, generated photoelectrons are transferred to either one of the two charge accumulating units at high speed, and charges corresponding to a phase difference (that is, time difference) between the light emitting pulse and the light receiving pulse are accumulated. A signal depending on the accumulated charges is output from the three-dimensional sensor 13 as a digital signal corresponding to a charge depending on the phase difference between the light emitting pulse and the light receiving pulse for each light receiving region via an analog digital (AD) converter. That is, the three-dimensional sensor 13 outputs a signal corresponding to time from when light is emitted from the light emitting element array 11 until the light is received by the three-dimensional sensor 13. The three-dimensional sensor 13 may include a condenser lens.

The shape specifying unit 15 included in the optical device control unit 14 acquires a digital value generated for each light receiving region of the three-dimensional sensor 13, calculates a distance to the object to be measured for each light receiving region, and specifies a three-dimensional shape of the object to be measured.

On the other hand, the authentication processing unit 17 included in the system control unit 16 performs authentication processing related to use of the information processing device 10 when the three-dimensional shape (specific result) of the object to be measured that is specified by the shape specifying unit 15 coincides with the three-dimensional shape accumulated in advance in the ROM 18 or the like. The authentication processing related to the use of the information processing device 10 is, for example, processing as to whether or not to permit the use of an own device (information processing device 10). For example, when the three-dimensional shape of a face as the object to be measured coincides with the face shape stored in a storage means unit such as the ROM 18, the information processing device 10 including various applications provided by the information processing device 10 is permitted to be used.

The shape specifying unit 15 and the authentication processing unit 17 are configured by programs as an example. Further, they may be configured by an integrated circuit such as an ASIC and an FPGA. Furthermore, they may be configured by a software such as a program and the integrated circuit.

As described above, the light emitting element array 11 emits light for specifying the three-dimensional shape of the object to be measured and irradiates the object to be measured. That is, the light emitting element array 11 emits light having a predetermined density with respect to a predetermined measurement range. A form of a plurality of light emitting elements included in the light emitting element array 11 is not particularly limited, and a vertical cavity surface emitting laser (VCSEL), a light emitting diode (LED), and the like are used, but the VCSEL is used as an example in the exemplary embodiment. Preferably, the VCSEL is configured by a multi-mode VCSEL that is easier to be output high than a single-mode VCSEL.

Figure 2A:
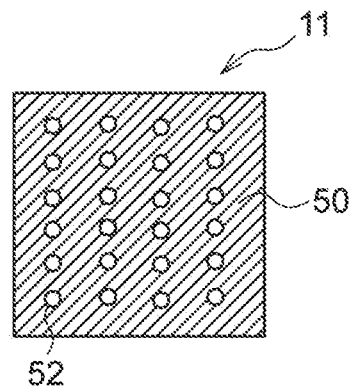
FIG. 2A is a plan view of a light emitting element array.

A plurality of VCSELs (light emitting elements) are electrically connected in parallel with each other. Light output per VCSEL is set to, for example, 4 mW to 8 mW, and the number of VCSELs included in the light emitting element array 11 is, for example, 100 to 1,000. FIG. 2A shows a plan view of the light emitting element array 11. As shown in FIG. 2A, the surface of the light emitting element array 11 is covered with a solid anode pattern 50 (electrode wiring) formed in a region other than a light emission port 52 of each VCSEL, and has a connection region formed by bonding wires of the anode pattern 50 at an end along each side of the light emitting element array 11. The semiconductor substrate of the light emitting element array 11 is set to, for example, an n-type GaAs substrate, and a cathode electrode is arranged on the back surface side of the substrate.

Figure 2B:
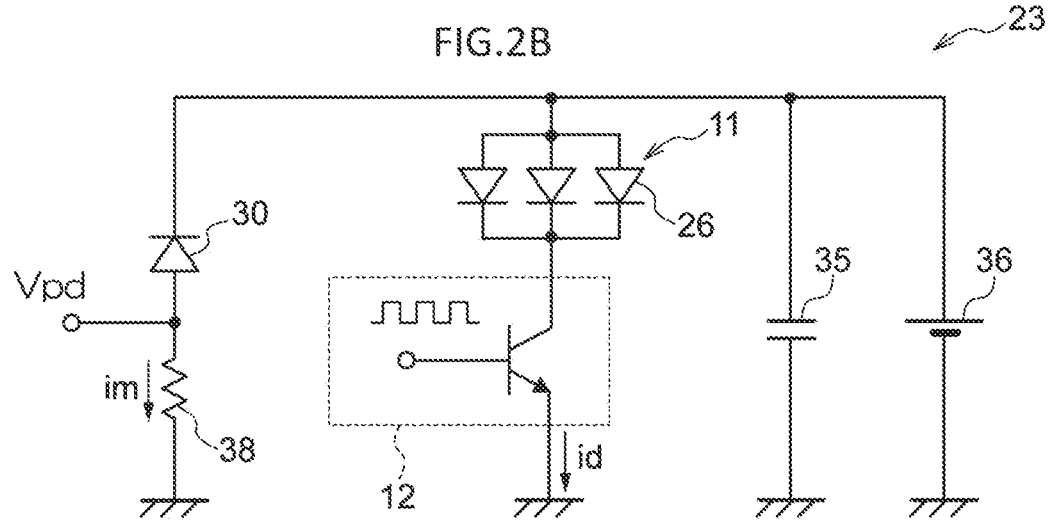
FIG. 2B is a circuit diagram of the light emitting device.

A drive circuit of the light emitting element array 11 is described with reference to FIG. 2B. FIG. 2B shows a circuit diagram of the light emitting device 23. As shown in FIG. 2B, the light emitting device 23 includes the light emitting element array 11, the driving element 12, a light amount monitoring light receiving element 30, a resistor 38, a capacitor 35, and a power source 36.

As described above, the light emitting element array 11 is configured by connecting a plurality of VCSELs 26 in parallel. A current source included in the driving element 12 is connected to the VCSELs 26 connected in parallel, and a driving current id is supplied from the current source.

The light amount monitoring light receiving element 30 has a function of monitoring a light amount of the light emitting element array 11. That is, an output signal from the light amount monitoring light receiving element 30 is used for controlling so as to emit light while maintaining the light amount predetermined by the light emitting element array 11. The light amount monitoring light receiving element 30 is, for example, a photodiode (PD) formed of silicon or the like that outputs an electric signal depending on a light receiving amount. That is, the light amount monitoring light receiving element 30 receives a part of the light emitted from the light emitting element array 11 and outputs a monitor current im depending on the light receiving amount. The monitor current im is converted into a voltage by a resistor 38 and is output as a monitor voltage Vpd. The monitor voltage Vpd is sent to a light amount monitoring circuit provided inside the driving element 12, which is omitted in the drawings, and the light amount monitoring circuit monitors the amount of light emitted from the light emitting element array 11 based on the monitor voltage Vpd. The light amount monitoring light receiving element 30 is an example of a "circuit element" according to the present invention.

On the other hand, the power source 36 operates the light emitting element array 11 and the light amount monitoring light receiving element 30, and the capacitor 35 has a function as a current source as will be described later. The power source 36 includes, for example, a power source layer and a ground layer provided inside a wiring substrate 27.

Figure 3A:
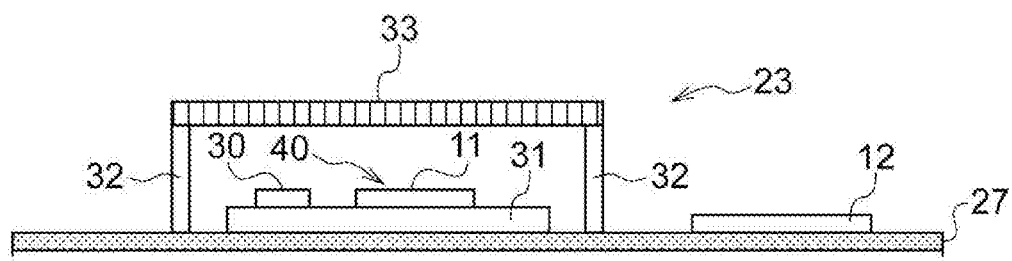
FIG. 3 includes a side sectional view and a plan view of the light emitting device according to the exemplary embodiment.
Figure 3B:
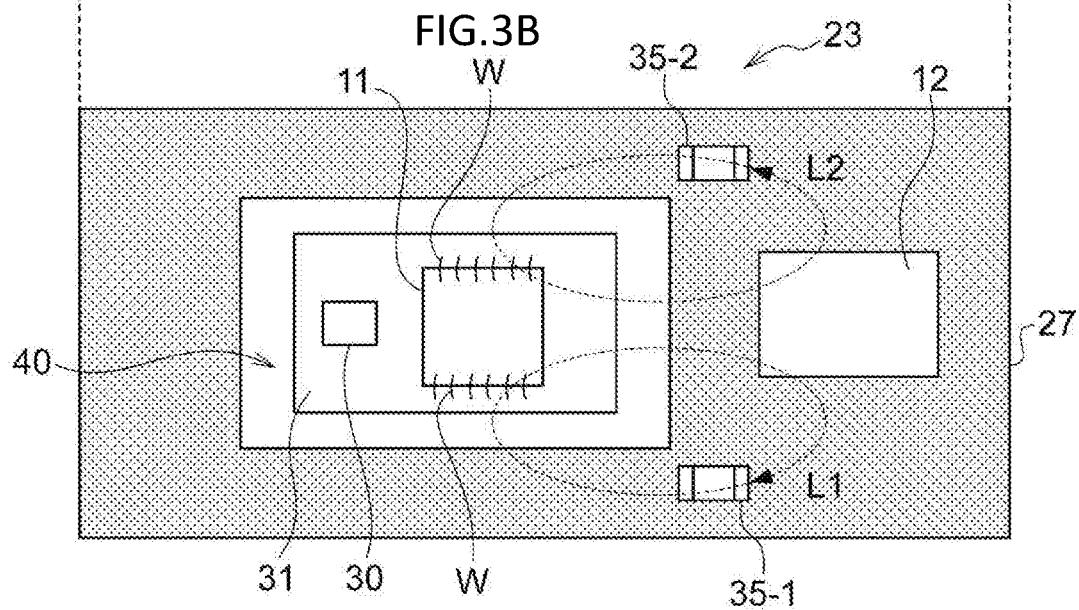

Next, a configuration of the light emitting device 23 according to the exemplary embodiment will be described with reference to FIGS. 3A and 3B. FIG. 3A is a side sectional view of the light emitting device 23, and FIG. 3B is a plan view of the light emitting device 23. As shown in FIGS. 3A and 3B, the light emitting device 23 includes a light emitting module 40 mounted on the wiring board 27, a light diffusion plate 33, a spacer 32, and the driving element 12. The wiring substrate 27 is formed of, for example, a glass epoxy substrate on which wiring that connects each element is formed. The light diffusion plate 33 is an example of the "light diffusion member" according to the present invention.

The light emitting module 40 includes a base material 31, the light emitting element array 11 mounted on the base material 31, and the light amount monitoring light receiving element 30. The base material 31 is formed with ceramic as an example, and has a function of efficiently dissipating heat mainly generated in the light emitting element array 11. This is because heat dissipation is a problem since output of the light emitting element array 11 is as large as several W. More specifically, the base material 31 is formed of aluminum oxide, aluminum nitride, or the like. The base material 31 may be formed using a common material as a wiring substrate such as glass epoxy. In this case, although heat radiation efficiency decreases as compared with the base material of ceramic, the light emitting element array 11 and the light amount monitoring light receiving element 30 can be configured as one module package, and as a result, circulation and treatment becomes easier compared with a case where the module package is not used.

Figure 2C:
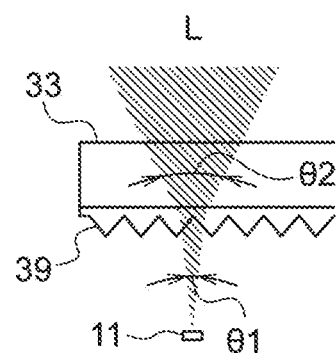
FIG. 2C is a side sectional view illustrating a function of a light diffusion plate according to the exemplary embodiment.

Here, in the TOF method, it is necessary to irradiate an irradiation surface of the object to be measured (for example, several meters ahead) with a uniform laser beam in a predetermined range. Therefore, the light diffusion plate 33 has a function of diffusing emitted light L emitted from the light emitting element array 11 and expanding a light emission angle. That is, as shown in FIG. 2C, the light diffusion plate 33 includes a concave-convex member 39, and the light emission angle of the emitted light L emitted from the light emitting element array 11 at a light emission angle θ1 is increased to θ2 (>θ1). More specifically, the light diffusion plate 33 includes, for example, the concave-convex member 39 formed of a resin layer in which a concavity and convexity for diffusing light is formed on one surface of a flat glass base material having two parallel surfaces. With the concavity and convexity, the emitted light L emitted from the light emitting element array 11 is further diffused and emitted to the outside.

The spacer 32 is arranged between the wiring substrate 27 and the light diffusion plate 33, supports the light diffusion plate 33, and is positioned so that a distance of the light diffusion plate 33 from the light emitting element array 11 is a predetermined distance. In addition, in the exemplary embodiment, the light emitting element array 11 and the like are sealed by the light diffusion plate 33 and the spacer 32 to prevent dust, prevent moisture, and the like. The spacer 32 is formed of, for example, ceramic or a resin material.

The light diffusion plate 33 further has a function of guiding part of the light emitted from the light emitting element array 11 to the light amount monitoring light receiving element 30. That is, the light diffusion plate 33 is provided by covering the light emitting element array 11 and the light amount monitoring light receiving element 30, and is arranged such that light reflected by the back surface of the light diffusion plate 33 is received by the light amount monitoring light receiving element 30 without passing through the light diffusion plate 33. As the distance from the light emitting element array 11 increases, the amount of light received in the light amount monitoring light receiving element 30 decreases, so that the light emitting element array 11 and the light amount monitoring light receiving element 30 are preferably arranged close to each other. The light amount monitoring light receiving element 30 is also used for detecting that the light emitted from the light emitting element array 11 is directly emitted to the outside since the light diffusion plate 33 is detached or damaged.

In the VCSEL array used for measuring the TOF, for example, it may be required that a large current of 2 A is risen at a rise time of 1 ns or less, or the VCSEL array is driven at a high frequency of about 100 MHz, so that it is important to reduce inductance components of the drive circuit. As one of the methods of reducing the inductance components, it is considered to increase bonding wires as much as possible, but it is also assumed that only this is not sufficient. Therefore, in the exemplary embodiment, a contrivance is made to reduce the inductance components caused by the base material 31. In order to reduce inductance of the drive circuit, it is important to shorten a current loop formed by the capacitor 35 as the current source, the light emitting element array 11, and the driving element 12. FIG. 3B illustrates a case where two capacitors 35-1 and 35-2 are arranged as the capacitor 35, and two current loops L1 and L2 are formed.

Further, in the exemplary embodiment, in order to efficiently dissipate heat from the light emitting element array 11, the light emitting element array 11 is not directly mounted on the wiring substrate 27 such as a printed circuit board, and is mounted on the wiring substrate 27 via the heat dissipation base material 31. In addition, a circuit element such as the light amount monitoring light receiving element 30 that receives light emitted from the light emitting element array 11 is mounted on the light emitting element array 11 and the heat dissipation base material 31 in proximity to the light emitting element array 11. In order to drive the light emitting element array 11 at high speed in a configuration in which the light emitting element array 11 and the light amount monitoring light receiving element 30 (circuit element) are aligned on the surface of the base material 31, it is desired to reduce the inductance components between the anode pattern 50 (upper electrode) of the light emitting element array 11 and the wiring substrate 27 on which the base material 31 is mounted. The light emitting module 40 according to the exemplary embodiment is taken into consideration in the above respects.

Figure 4A:
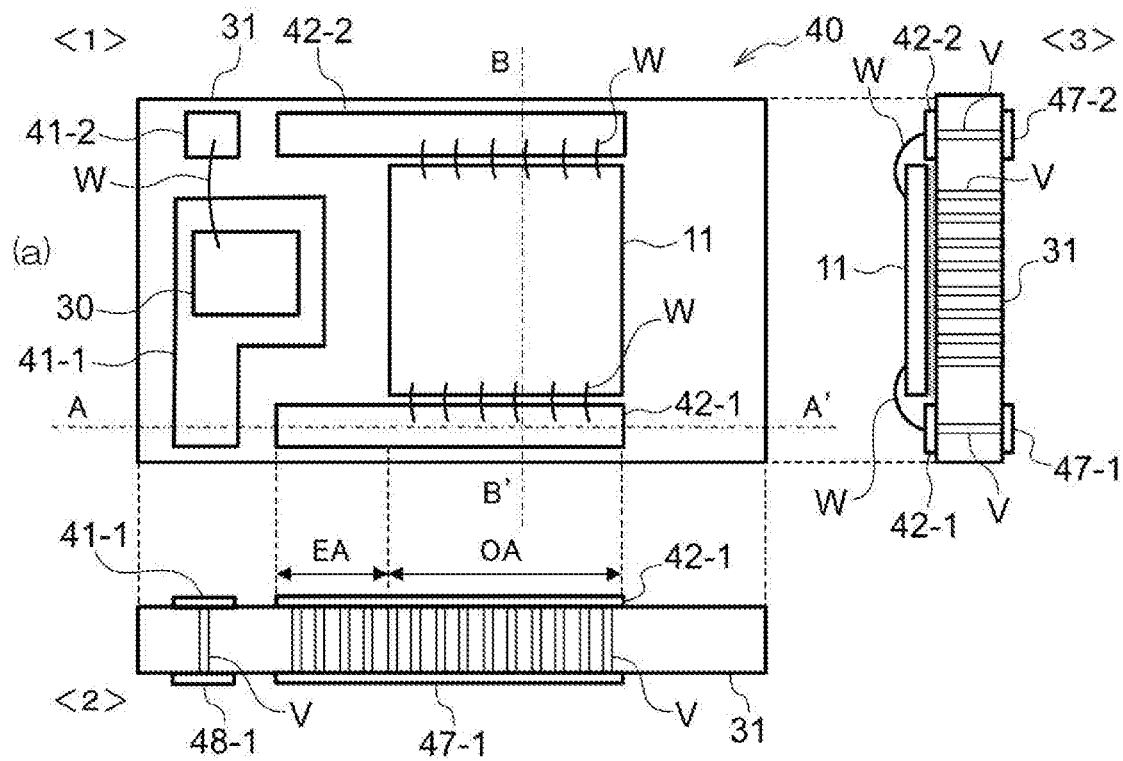
FIG. 4A includes a plan view and a side sectional view.

The light emitting module 40 according to the exemplary embodiment is described in more detail with reference to FIGS. 4A to 4C. As described above, the light emitting module 40 according to the exemplary embodiment includes the base material 31, the light emitting element array 11 mounted on the base material 31, and the light amount monitoring light receiving element 30. In FIG. 4A, <1> shows a plan view of the light emitting module 40; <2> shows a side sectional view taken along a line A-A' in <1>; and <3> shows a side sectional view taken along a line B-B' in <1>.

As shown in <1> of FIG. 4A, conductive patterns 42-1, 42-2, 41-1, and 41-2 are formed on the base material 31. Each of the conductive patterns 42-1, 42-2, 41-1, and 41-2 is formed of, for example, a vapor-deposited film made of gold or the like, a silver paste, or the like. The conductive patterns 42-1 and 42-2 are patterns that relay connection between the light emitting element array 11 and the wiring substrate 27, and the conductive patterns 41-1 and 41-2 are patterns that relay connection between the light amount monitoring light receiving element 30 and the wiring substrate 27.

As shown in <1> and <3> of FIG. 4A, the light emitting element array 11 and each of the conductive patterns 42-1 and 42-2 are connected by a bonding wire W. The back surface electrode of the light emitting element array 11 is connected to a conductive pattern (not shown) formed on the base material 31 by a conductive bonding member or the like, and is electrically connected to the back surface electrode of the light emitting element array 11. On the other hand, as shown in <1> and <2> of FIG. 4A, each of the conductive patterns 42-1 and 42-2 is connected to the conductive patterns 47-1 and 47-2 on the back surface of the base material 31 via a via V. Each of the conductive patterns 47-1 and 47-2 is connected to a wiring pattern formed on the wiring substrate 27, and the light emitting element array 11 is connected to another circuit or the like mounted on the wiring substrate 27. The "bonding wire W" is an example of the "wiring" according to the present invention, and the "via V" is an example of a conductive "penetrating member" according to the present invention.

The back surface electrode of the light amount monitoring light receiving element 30 and the conductive pattern 41-1 are connected by a conductive bonding member to electrically connect the back surface electrode of the light amount monitoring light receiving element 30. The other electrode of the light amount monitoring light receiving element 30 and the conductive pattern 41-2 are connected by the bonding wire W. Further, as shown in and FIGS. 4A and 4B, each of the conductive patterns 41-1 and 41-2 is connected to the conductive patterns 48-1 and 48-2 (the conductive pattern 48-2 cannot be seen behind the conductive pattern 48-1 in FIG. 4A, see FIG. 4B) on the back surface of the base material 31 via the vias V, respectively. Each of the conductive patterns 48-1 and 48-2 is connected to a wiring pattern formed on the wiring substrate 27, and the light amount monitoring light receiving element 30 is connected to the light amount monitoring circuit inside the driving element 12 mounted on the wiring substrate 27.

Figure 4B:
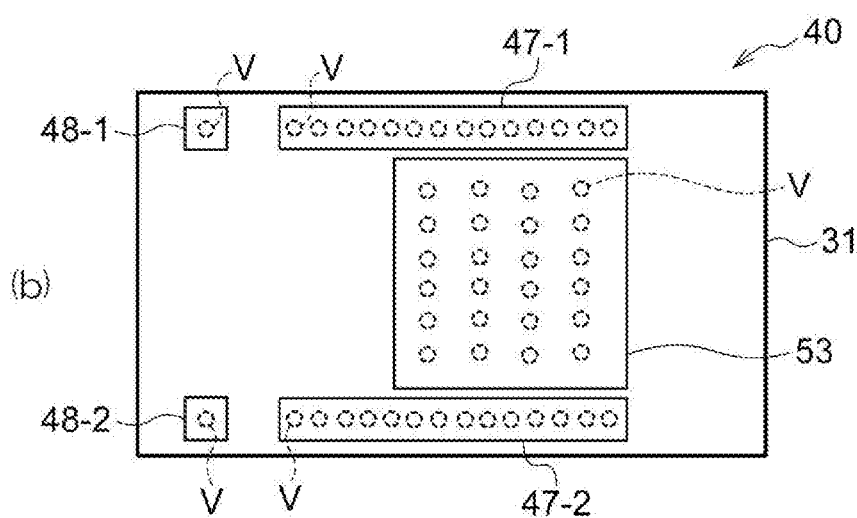
FIG. 4B is a back surface view.

FIG. 4B shows the back surface of the base material 31. As shown in FIG. 4B, the conductive patterns 47-1, 47-2, 48-1, and 48-2 are formed on the back surface of the base material 31. Further, the conductive pattern 53 is formed on the back surface of the base material 31 at a position corresponding to the light emitting element array 11, and the conductive pattern 53 is connected to the back surface of the light emitting element array 11 via the via V.

Next, a method of reducing the inductance components in the light emitting module 40 according to the exemplary embodiment will be described. As shown in FIG. 4A, the conductive patterns 42-1 and 42-2 according to the exemplary embodiment have a conductive region OA and an extended conductive region EA. The conductive region OA has a length along a side of the light emitting element array 11, and the extended conductive region EA pass beyond the side of the conductive region OA, and extends toward a direction of the light amount monitoring light receiving element 30. The vias V are formed on the conductive region OA and the extended conductive region EA. In this manner, it is preferable that the light amount monitoring light receiving element 30 is arranged on a center side in a width direction of the base material 31, and the extended conductive region EA is extended to a position facing a part of the light amount monitoring light receiving element 30 (circuit element). This increases the area connecting the penetrating members, as compared with a case where the extending region is not extended to a position facing a part of the light amount monitoring light receiving element 30. The conductive region OA is an example of the "facing region" according to the present invention. The extended conductive region EA is an example of the "extending region" according to the present invention. A plurality of vias V are formed on the conductive region OA and the extended conductive region EA in FIG. 4A. At least one via V may be formed on the conductive region OA and at least one via V may be formed on the extended conductive region EA.

FIGS. 6A and 6B is a light emitting module 80 according to a comparative example shown for comparison with the light emitting module 40. FIG. 6A shows a plan view of the light emitting module 80, and FIG. 6B shows a side sectional view taken along a line C-C' shown in FIG. 6A. In FIGS. 6A and 6B, the same components as those of the light emitting module 40 are denoted by the same reference numerals, and detailed description thereof is omitted.

As shown in FIGS. 6A and 6B, in the light emitting module 80, the conductive patterns 46-1 and 46-2 corresponding to the conductive patterns 42-1 and 42-2 in the light emitting module 40 do not have extended conductive regions. That is, each of the conductive patterns 46-1 and 46-2 has only a length along one side of the light emitting element array 11. Therefore, the number of the vias V connected to each of the conductive patterns 46-1 and 46-2 (a case of nine is exemplified in FIG. 6B) is smaller than the number of the vias V connected to each of the conductive patterns 42-1 and 42-2 (a case of 14 is exemplified in <2> of FIG. 4A).

That is, since the light emitting module 40 according to the exemplary embodiment has the vias V not only in the conductive region OA but also in the extended conductive region EA, the number of the inductance components caused by the vias V connected in parallel increases, and as a result, the inductance component from the light emitting element array 11 to the wiring substrate 27 is smaller than that of the light emitting module 80 according to the comparative example.

Here, a relationship between the bonding wire W, the via V, and the conductive patterns 42-1 and 42-2 according to the exemplary embodiment for further reducing the inductance components is described. By employing the following configuration, the inductance components from the light emitting element array 11 to the wiring substrate 27 are further reduced.

Figure 4C:
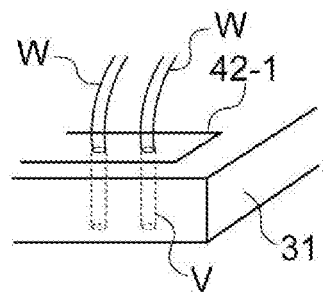
FIG. 4C is a view showing a connection state of a bonding wire and a via of a light emitting module according to the exemplary embodiment.

A plurality of bonding wires W may be connected in a row shape on the conductive patterns 42-1 and 42-2, and connection points between the vias V and the conductive patterns 42-1 and 42-2 and connection points between the bonding wires W and the conductive patterns 42-1 and 42-2 may be arranged to overlap as shown in FIG. 4C. That is, at least a part of the cross section of the bonding wire W and at least a part of the cross section of the via V may be arranged to overlap in a plan view. A form in which a plurality of bonding wires W may be connected in a row shape on the conductive patterns 42-1 and 42-2 is not limited to the form shown in FIG. 4C, and connection points between the vias V and the conductive patterns 42-1 and 42-2 and connection points between the bonding wires W and the conductive patterns 42-1 and 42-2 may be a form arranged in a row alternately. In this case, at least a part of the connection points between the vias V and the conductive patterns 42-1 and 42-2 and the connection points between the bonding wires W and the conductive patterns 42-1 and 42-2 may overlap or may not overlap.

In addition, the number of the vias V may be larger than the number of the bonding wires W. When inductance of the drive circuit is to be reduced by increasing the number of the bonding wires W, it is necessary to increase the size of the light emitting element array 11 depending on the number of the bonding wires W. On the other hand, when the inductance of the drive circuit is reduced by increasing the number of the vias V, it is not necessary to increase the size of the light emitting element array 11.

A total cross-sectional area of the plurality of vias V may be larger than a total cross-sectional area of the plurality of bonding wires W.

In a shape of a region (light emitting region) in which the plurality of VCSELs 26 (light emitting elements) are arranged in an external form of the light emitting element array 11, a length in a direction intersecting with the conductive pattern 42-1 or 42-2 may be longer than a length in a direction along the conductive pattern 42-1 or 42-2. When an area of the light emitting region is the same, it is not necessary to arrange the bonding wire W to a position far from the driving element 12 when the length in the direction along the conductive pattern 42-1 or 42-2 is short. Accordingly, two current loops L1 and L2 in FIG. 3 are easily set to be short.

<Modification>

A modification of the light emitting module 40 according to the exemplary embodiment is described with reference to FIG. 5. In the following description, the same components as those of the light emitting module 40 are denoted by the same reference numerals, and detailed description thereof is omitted.

Figure 5A:
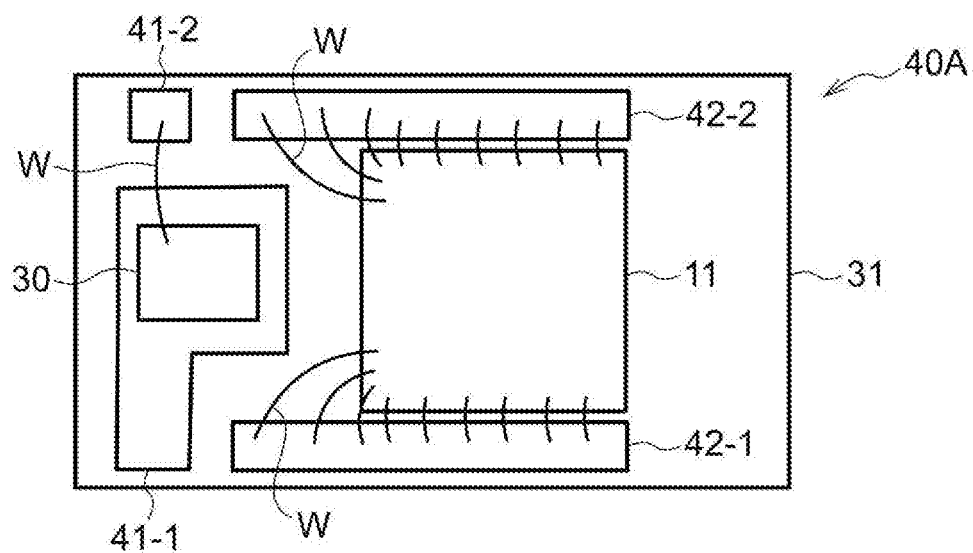
FIG. 5A is a plan view of a first modification.

FIG. 5A illustrates a light emitting module 40A according to a first modification. A difference between the light emitting module 40A and the light emitting module 40 is that the bonding wires W are connected to not only the conductive region OA but also the extended conductive region EA in the light emitting module 40A. This increases the number of bonding wires W connected in parallel, so that the inductance components can be further reduced. The bonding wires W are connected to the conductive region OA and the extended conductive region EA in FIG. 5A. At least one bonding wire W may be connected to the conductive region OA and at least one bonding wire W may be connected to the extended conductive region EA.

Figure 5B:
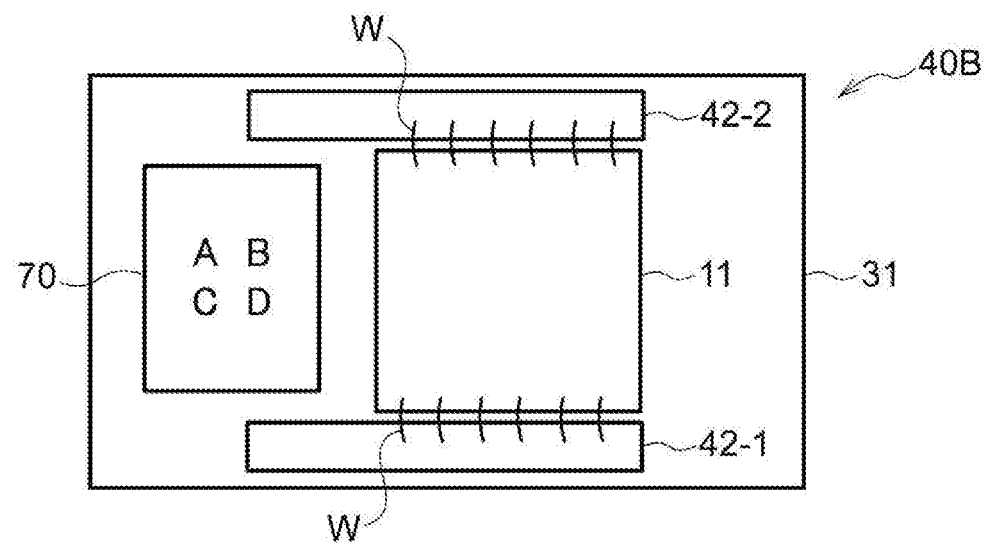
FIG. 5B is a plan view of a second modification.

FIG. 5B shows a light emitting module 40B according to a second modification. A difference between the light emitting module 40B and the light emitting module 40 is that an identification display region 70 is arranged in place of the light amount monitoring light receiving element 30 in the light emitting module 40B. The identification display region 70 is formed of, for example, a conductive pattern on the base material 31, and includes at least one of characters, numbers, and signs that identifies the own device and the other devices. As described above, the "circuit element" according to the present invention is not limited to an electric component such as the light amount monitoring light receiving element 30, but may be a non-electric component mounted or formed on the base material 31. According to the second modification, even though the circuit element is the identification display region 70, the inductance components are further reduced.

FIG. 5C shows a light emitting module 40C according to a third modification. A difference between the light emitting module 40C and the light emitting module 40 is that a capacitor 72 is arranged in place of the light amount monitoring light receiving element 30 in the light emitting module 40C. In the light emitting module 40C, conductive patterns 43-1 and 43-2 to which the bonding wires W from the light emitting element array 11 are connected are connected by a conductive pattern 44, and the capacitor 72 is connected between the conductive pattern 44 and a conductive pattern 45. Like capacitors 35-1 and 35-2, the capacitor 72 has a function as a current source. According to the third modification, even though the circuit element is the capacitor 72, the inductance components are further reduced.

Although a form in which two conductive patterns are used as the conductive pattern connected by the light emitting element array and the bonding wire W is described as an example in the above exemplary embodiments, the present invention is not limited thereto, and either one of the conductive patterns may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light emitting device comprising:
a base material mounted on a wiring substrate;
a light emitting element array that emits light and is provided on the base material;
a first conductive pattern provided on the surface of the base material, the first conductive pattern including
a first facing region connected to the light emitting element array, the first facing region being along a side surface of the light emitting element array and facing to the light emitting element array, and
a first extending region extended beyond the first facing region; and
a plurality of penetrating members penetrating the base material from the first conductive pattern to a back surface side of the base material, at least one of the penetrating members being directly connected to the first facing region and at least one of the penetrating members being directly connected to the first extending region,
wherein the first facing region and the first extending region are in direct contact with each other.

2. A light emitting device according to claim 1, further comprising
a circuit element provided adjacent to the light emitting element array in a direction in which the first conductive pattern extends,
wherein the first extending region extends to a position facing at least a part of the circuit element.

3. A light emitting device according to claim 2, further comprising
a second conductive pattern provided on the surface of the base material opposite to the first conductive pattern with respect to the light emitting element array, the second conductive pattern including
a second facing region facing the light emitting element array, and
a second extending region extended beyond the second facing region to the circuit element side,
wherein at least a part of the circuit element is provided between the first extending region and the second extending region.

4. A light emitting device according to claim 2,
wherein the circuit element is a photoelectric conversion element that receives light emitted from the light emitting element array.

5. A light emitting device according to claim 4, further comprising
a light diffusion member provided above the light emitting element array and the photoelectric conversion element, the light diffusion member being configured to diffuse light emitted from the light emitting element array.

6. A light emitting device according to claim 2,
wherein the circuit element is a capacitor that supplies current to the light emitting element array.

7. A light emitting device according to claim 1, further comprising
a back surface side conductive pattern provided on the back surface of the base material,
wherein the penetrating member connects the first conductive pattern with the back surface side conductive pattern.

8. A light emitting device according to claim 1, further comprising
a plurality of wirings connecting the light emitting element array and the first conductive pattern, each wiring being connected to the first facing region or the first extending region.

9. A light emitting device according to claim 8,
wherein the plurality of wirings are connected onto the first conductive pattern in a row shape, and the plurality of penetrating members are provided to overlap the row shaped regions.

10. A light emitting device according to claim 8,
wherein connection points of the penetrating members to the first conductive pattern overlap connection points of the wirings to the first conductive pattern.

11. A light emitting device according to claim 8,
wherein a number of the penetrating members is greater than a number of the wirings.

12. A light emitting device according to claim 8,
wherein a total of cross-sectional areas of the plurality of penetrating members is larger than a total of cross-sectional areas of the plurality of wirings.

13. A light emitting device according to claim 1,
wherein the light emitting element array includes a plurality of light emitting elements, and
a shape of a region where the light emitting elements are aligned in the light emitting element array has a side in a direction along the first conductive pattern that is longer than a side of the light emitting element array in a direction intersecting with the first conductive pattern.

14. A light emitting device according to claim 13,
wherein the plurality of light emitting elements are connected in parallel with each other.

15. A light emitting device according to claim 1,
wherein the base material is formed of ceramic.

16. A light emitting device according to claim 1, further comprising
an identification display region provided adjacent to the light emitting element array in a direction in which the first conductive pattern extends,
wherein the first extending region extends to a position facing at least a part of the identification display region.

17. A light emitting device according to claim 16,
wherein the identification display region displays at least one of characters, numbers, and signs identifying an own device and the other devices.

18. An optical device comprising
the light emitting device according to claim 1, and
a three-dimensional sensor that receives reflected light that is emitted from the light emitting element array of the light emitting device and reflected by an object to be measured,
wherein the three-dimensional sensor outputs a signal corresponding to a period from a time when the light is emitted from the light emitting element array to a time when the light is received by the three-dimensional sensor.

19. An information processing device comprising
the optical device according to claim 18, and
a shape specifying unit that specifies a three-dimensional shape of the object to be measured based on the reflected light that is emitted from the light emitting element array reflected by the object to be measured, and received by the three-dimensional sensor of the optical device.

20. An information processing device according to claim 19, further comprising
an authentication processing unit that performs authentication processing related to use of the own device based on a specific result in the shape specifying unit.

* * * * *